June 6, 1967  K. MERKEL ET AL  3,324,164
PRODUCTION OF β-CYANOETHYL ETHERS AND THIOETHERS
Filed April 15, 1964
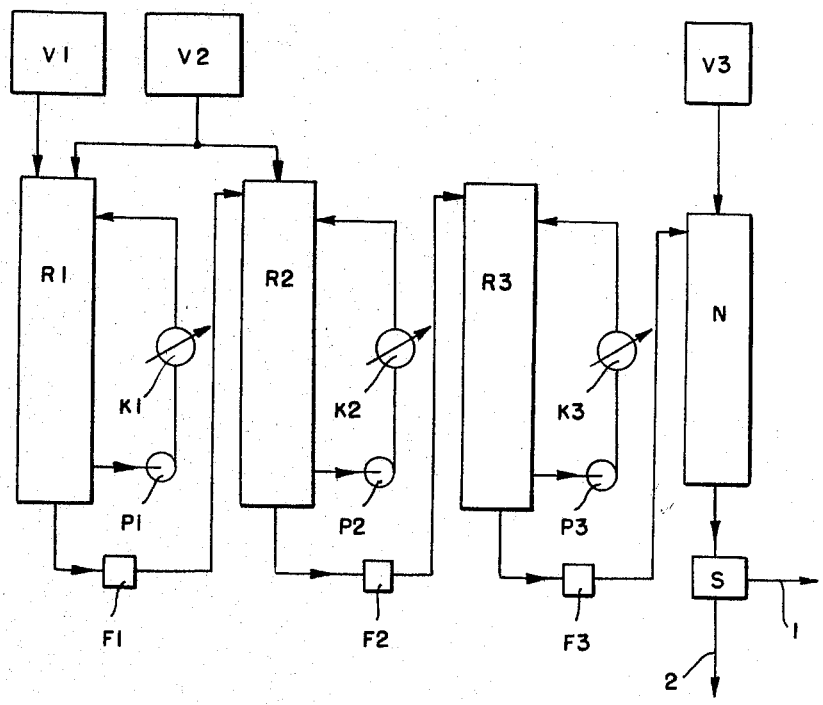
INVENTORS:
KARL MERKEL
ERICH HAARER
HUBERT CORR
BY
ATT'YS _United States Patent Office_

3,324,164
Patented June 6, 1967

3,324,164
PRODUCTION OF β-CYANOETHYL ETHERS
AND THIOETHERS
Karl Merkel, Erich Haarer, and Hubert Corr, all of Ludwigshafen (Rhine), Germany, assignors to Badische Anilin- & Soda-Fabrik Aktiengesellschaft, Ludwigshafen (Rhine), Germany
Filed Apr. 15, 1964, Ser. No. 359,957
Claims priority, application Germany, Apr. 20, 1963,
B 71,578
4 Claims. (Cl. 260—465)

This invention relates to a new, very economical and industrially superior process for the production of β-cyanoethyl ethers and thioethers by reaction of monohydric or polyhydric alcohols or thiols with acrylonitrile.

The preparation of β-cyanoethyl ethers and thioethers by the reaction illustrated by the equation:—

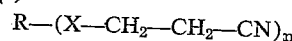

in which R denotes a monohydric or polyhydric alcohol or thiol radical, X denotes oxygen or sulfur and $n$ denotes the valency, preferably from 1 to 4, from monohydric or polyhydric alcohols or thiols is already known (compare, inter alia, the detailed collective abstract by H. A. Bruson in "Organic Reactions," Wiley & Sons, 1949, volume 5, chapter 2).

This reaction, which is usually known as cyanoethylation, has hitherto been carried out in principle by placing the alcohol or thiol with the catalyst dissolved therein in a reactor, allowing the acrylonitrile to run into it at temperatures between 0° and 100° C. and, when the reaction is over, processing the reaction mixture to the desired product by means of conventional separating methods.

Working in this way, however, has a number of disadvantages. For reasons not hitherto known, the reaction may unexpectedly proceed explosively, particularly if large amounts of acrylonitrile have accumulated in the reactor. Apart from the fact that such strongly exothermic spontaneous reactions can only be controlled with extreme difficulty owing to the amount of heat occurring, the formation of byproducts is favored so that not only are the yields of desired substance decreased but processing of the reaction mixture is made more difficult (compare for example "Organic Reactions," loc. cit., page 81, last two paragraphs, and U.S. Pat. No. 2,579,580, filed Sept. 18, 1950, column 1, lines 30 to 47).

While this disadvantage can be avoided by carrying out the reaction in batches which are not too large and by taking care in other ways that the concentration of unreacted acrylonitrile in the reactor remains as low as possible, the space-time yields are accordingly usually very low in the prior art methods and modifications thereof. Space-time yield is defined as the yield obtained per unit of time and per unit of volume of the reactor.

There has been no lack of attempts to improve the yield and particularly the space-time yield in cyanoethylations. For example if an excess of acrylonitrile is used, in spite of the risk of an uncontrollable course of the reaction, there is the further disadvantage that polymerization of acrylonitrile becomes very troublesome. This secondary reaction can seldom be wholly suppressed when working with an excess of acrylonitrile, even when conventional polymerization inhibitors are used. Furthermore wide deviations from stoichiometric ratios occassion increased processing costs because the excess reactants have to be separated. This is particularly difficult when it involves removal by distillation of the high boiling point alcohols or thiols present in excess, because β-cyanoethyl ethers and thioethers tend to decompose at elevated temperatures.

A general disadvantage of the prior art methods, which are almost exclusively carried out batchwise, is that the yields of these methods have an upper limit, usually between 80 and 90%, which cannot be exceeded in practice.

Previous attempts to carry out cyanoethylation of monohydric or polyhydric alcohols or thiols continuously in reaction towers by conventional methods have not brought any advantage over the batchwise methods.

It is the object of this invention to provide a continuous cyanoethylation process which can be used on an industrial scale so that the important β-cyanoethyl ethers and thioethers can be made accessible more easily and more economically.

We have found that β-cyanoethyl ethers and thioethers of monohydric or polyhydric alcohols or thiols with stoichiometric or substantially stoichiometric amounts of acrylonitrile can be prepared in the liquid phase in a very economical and technically superior way in high yields by carrying out the reaction while supplying the reactants simultaneously to at least two series-connected and separate reactors, with intense mixing in each, the residence period in the first reactor being such that not more than 80% of the total reaction takes place therein, and the reaction being ended in the last reactor at a higher temperature than in the first.

We have further found that it is very advantageous in this process to effect the intense mixing in each reactor by circulation of the liquid, i.e., by withdrawing the liquid reaction mixture at the bottom of the reactor by means of a pump and supplying it again at the top of the reactor.

We have also found that it is most advantageous to provide about equal residence periods in the reactors and to regulate the speed of reaction so that the ratio of the conversion in one reactor to that in the next reactor 15:3 to 2:3, it being necessary for this purpose for the temperature to be higher in each successive reactor.

We have furthermore found that in most cases a considerable increase in yield is achieved by removing from each reactor the solids resulting from the reaction.

There is no detectable dependence of the success of the process according to this invention on the spatial arrangement and shape of the reactors and associated apparatus. The reactions may be carried out in a plurality of successive vessels with stirrers or reaction towers having the same or different size, depending on local conditions. A reaction tower subdivided into a plurality of separate zones has proved to be very suitable, and for smaller industrial plant a reactor in the form of a long tube bent into a spiral or in the form of tube banks.

Reaction takes place in homogeneous liquid phase at atmospheric, superatmospheric or subatmospheric pressure.

In order to optimalize the process, the relative proportions of the reactants should be as nearly stoichiometric as possible. It is a particular advantage of the process according to this invention that this ideal can be almost realized. Nevertheless in individual cases, it is dependent on the chemical reaction, whether deviation from stoichiometric ratios, particularly an excess of alcohol or thiol, may not sometimes be preferable. It has not been observed, however, that deviations of more than 20 equivalent percent are necessary.

The reaction is better controllable the greater the number of reactors which are connected in series; on the other hand, from the point of view of equipment cost, it is more economical to use fewer reactors. The necessary number of reactors is therefore a compromise which is satisfied within the scope of the present invention often by two reactors, as a rule by three reactors and in the case of the reaction of sensitive initial materials by more than three reactors.

An essential feature of the invention is the intense mixing of the reaction mixture in each reactor, particularly in those to which initial materials are supplied. Intense mixing may be achieved for example by stirring means, by blowing in inert gas or, as described above, very advantageously by circulation of liquid. The last-mentioned method is most economical in large scale production in the case of reaction towers, since it permits the choice of different circulation speeds for each reaction chamber in a convenient way and moreover the liquid circulation may be connected with a cooling system for accurate temperature control. Normally the volumetric rate (parts by volume per unit of time) of the circulating liquid is adjusted so that it is ten to one thousand times, preferably ten to two hundred times the rate of supply to or withdrawal from the reactor of the reactants. The amount recirculated in each stage of the reaction may be identical or different.

It is advantageous to choose the reaction conditions so that the residence period in the reaction chambers is about equal and that 40 to 80% of the total conversion takes place in the first reaction chamber and 40 to 100% of the remaining conversion takes place in the subsequent reaction chambers. Since reaction speeds decrease when the residence period and temperature remain the same, it is necessary to provide a progressive rise in temperature in the reaction chambers to achieve the said conversion ratios. The temperatures required depend on the predetermined fixed magnitudes (residence period, conversion per reactor) and are not difficult to ascertain experimentally. Normally the rise in temperature from reactor to reactor is between 5° and 50° C., particularly between 5° and 20° C. The whole reaction takes place within a range from about 0° to 200° C., preferably between 50° and 100° C.

In some cases it is advantageous, in the interests of easier and more exact control of the reaction, to work in the first reactor with an excess of alcoholic or thiolic component so that a part of the acrylonitrile is supplied to the second reactor and in some cases to following reactors. It has been found that solids which cannot be more closely defined are precipitated during the reaction. It usually has a very favorable effect on the purity of the products if these solids are removed, for example by a filter or screen arranged in the liquid circulation of each reactor or in the pipeline from one reactor to the next or in a sedimentation chamber free from marked flow interposed between the reactors. This also prevents settling of the solids on the inner walls of the reactors.

Apparatus of non-corroding material, for example V2–A steel, which is typical for the process of this invention, will now be described with reference to the flow sheet shown in the accompanying drawing.

The whole amount of alcohol or thiol passes from a reservoir V1 into a reactor R1, capable of being heated and if necessary cooled, and a portion of the acrylonitrile is supplied from reservoir V2. Liquid is continuously withdrawn from the bottom of reactor R1 by a pump P1, passed through a cooler K1 and reintroduced at the upper end of the reactor. After leaving reactor R1, the reaction mixture passes through a filter F1 in which it is freed from solids and then passes into reactor R2 to which the remainder of the acrylonitrile from V2 is supplied. The procedure which has been described for the system R1–P1–K1–F1 is repeated for R2 and R3. When the reaction is over, the reaction mixture is neutralized in neutralizing chamber N into which a calculated amount of acid flows from reservoir V3 and the mixture then passes into a centrifuge S in which it is separated into (1) the product ($\beta$-cyanoethyl ether or thioether) and (2) the salt formed.

The process according to the invention, i.e., the cyanoethylation of alcohols and thiols, is substantially independent of the initial materials; the optimum reaction conditions may be ascertained without difficulty by conventional preliminary experiment within the teaching given above.

Both monohydric and polyhydric primary, secondary and tertiary aliphatic and aromatic alcohols, which may be substituted or contain hetero atoms, are suitable as alcohols. Examples of substituents and other functional groups contained in the molecule which do not interfere with the reaction are halogen atoms, nitrile groups, ester groups, ether groups, sulfonic ester groups and oxo groups; oxygen atoms, nitrogen atoms and sulfur atoms are suitable as hetero atoms; equivalent remarks apply to thiols.

To give only a few typical examples, the following products are obtained from the initial alcohols or thiols:

| Initial alcohol or thiol | Reaction product |
| --- | --- |
| Methanol | $\beta$-cyanoethyl methyl ether. |
| Tertiary butanol | $\beta$-cyanoethyl tertiary butyl ether. |
| Glycerin | Tri-$\beta$-cyanoethoxypropane-(1,2,3). |
| Pentaerythritol | Tetra-($\beta$-cyanoethoxymethyl)-methane. |
| 1,3-propylene glycol | Di-$\beta$-cyanoethoxyethane-(1,2). |
| Di-$\beta$-hydroxyethyl ether | Di-($\beta'$-cyanoethyl) diethyl ether. |
| Phenol | $\beta$-cyanoethyl phenyl ether. |
| Benzyl alcohol | $\beta$-cyanoethyl benzyl ether. |
| Cyclohexanol | $\beta$-cyanoethyl cyclohexyl ether. |
| 1,4-hydroxymethylcyclohexane | 1,4-(di-$\beta$-cyanoethoxymethyl)-cyclohexane. |
| Allyl alcohol | $\beta$-cyanoethyl allyl ether. |
| Propargyl alcohol | $\beta$-cyanoethyl propargyl ether. |
| Butene-(2)-diol-(1,4) | Di-$\beta$-cyanoethoxy-(1,4)-butene-(2). |
| Butyne-(2)-diol | Di-$\beta$-cyanoethoxybutyne-(2). |
| 4-aminobutanol-(1) | 4-amino-1-$\beta$-cyanoethoxybutane. |
| Ethylene cyanohydrin | Di-$\beta$-cyanoethyl ether. |
| Dodecanethiol (dodecylmercaptan). | $\beta$-cyanoethyl dodecyl thioether. | and the corresponding cyanoethyl compounds from polyethers and polyesters containing hydroxyl groups.

If alcohols or thiols which are solids or viscous liquids at the reaction temperatures concerned or in which the alkaline catalyst does not dissolve easily are used as initial materials, it is recommendable to use solvents. Suitable solvents are particularly water, ethers, esters and dimethylformamide.

All alkaline reacting catalysts suitable for the purpose may be used, for example sodium hydroxide, potassium hydroxide sodium methylate and quaternary ammonium hydroxides such as tetramethyl ammonium hydroxide. The amounts required may be for example between 0.001 and 10% by weight preferably between 0.1 and 3% by weight.

As in the batchwise process it is advantageous to stabilize the acrylonitrile by polymerization inhibitors for example by hydroquinone phenyl-$\beta$-naphthylamine copper salts and the like; the amounts required which are between 0.001 and 5% preferably between 0.01 and 1% by weight are as a rule however less than in the prior art methods.

The cyanoethylation process according to this invention is superior to all prior art methods as regards the high yields, high space-time yields and high purity which can be achieved therewith, but also requires less equipment. Since the reaction proceeds continuously and uniformly in a manner which can easily be controlled, it may be made partly or fully automatic without too great expenditure.

The products of the process are known to be valuable intermediates for organic syntheses, but some of them may be used directly, for example as plasticizers for plastics.

The invention is further illustrated by the following Example.

EXAMPLE

The way in which the process according to this invention may be carried out will be described by way of example with respect to the cyanoethylation of methanol according to the equation:

$$CH_3OH + CH_2=CH-CN \rightarrow CH_3-O-CH_2-CH_2-CN$$

Parts (except where stated otherwise) and percentages are by weight; parts by weight bear the same relation to parts by volume as the kilogram to the liter (S.T.P.).

The reaction is carried out in the apparatus described above and illustrated in the drawing. The three reactors R1, R2 and R3 all have the same volume, 830 parts by volume.

*Embodiment I*

376 parts per hour of methanol with 4.5 parts of sodium methylate dissolved therein flows from reservoir V1 and 623 parts of acrylonitrile with 0.2 part of hydroquinone dissolved therein flows per hour from reservoir V2 into reactor R1. A temperature of 50° C. is maintained in R1 by cooler K1 in the liquid circuit. The liquid mixture is continuously recycled by means of pump P1, the volumetric speed of circulation being 400 times the volumetric rate of supply of the two reactants. The liquid mixture flowing from R1 contains 60% of the desired product, the remainder being the initial materials. The mixture is freed from solids in the filter F1 and passed into reactor R2 in which a temperature of 70° C. prevails. The liquid circuit is the same as in the preceding stage. When the mixture leaves R2, 86% of the cyanoethyl ether has formed; this is approximately equivalent to a conversion ratio (conversion in R1 to that in R2) of 7.5:3. Reaction is completed in R3 at 90° to 95° C.; the volumetric speed of the liquid recirculation is 100 times the volumetric rate of the inflow and outflow of the reaction mixture. The residence period in each of the three reactors is twenty minutes.

After the usual processing, which in the present instance is also continuous and consists of neutralization of the reaction mixture in N with hydrochloric acid, separation of the deposited sodium chloride in the centrifuge S, 990 parts per hour of β-cyanoethyl methyl ether is obtained in a purity of 99%. This is equivalent to a yield of 98% of the theory. The product may easily be further purified to any desired extent by distillation. The space-time yield is calculated as follows: yield (in parts) per total reaction volume (in parts by volume) per total residence period (in hours); in the present case this is:

$$990/3 \times 830/3 \times 0.33 = \text{about 0.4 part per part by volume per hr.}$$

*Embodiment II*

This embodiment is the same as embodiment I except that filters F1, F2 and F3 are not used, i.e. the solids are not removed. 990 parts of product is obtained in a purity of 95%, equivalent to a yield of 94.5% and a space-time yield of 3.8 parts per part by volume per hour.

*Batchwise method (III)*

To show the advantages of the process according to this invention, the production of β-cyanoethyl methyl ether by the conventional prior art batchwise method will now be described for purpose of comparison:

623 parts of acrylonitrile stabilized with 0.5 part of hydroquinone is allowed to flow at 40° to 45° C. with good stirring into a solution of 4.5 parts of sodium methylate in 376 parts of methanol in the course of three hours. The whole is then stirred for another five hours at 45° to 50° C. and worked up as usual. 870 parts of β-cyanoethyl methyl ether is obtained in a purity of 94%, equivalent to a yield of 82% of the theory. The space-time yield (the reaction having been carried out in a vessel having a capacity of 2000 parts by volume) is accordingly about 0.05 part per part by volume per hour.

The essential data from the three methods described above is collected in the following table for immediate comparison: The columns in the table have the following significance:

E indicates which of the three methods has been used;
A1 and A2 give the supply in parts per hour of acrylonitrile to reactors R1 and R2, and M1 gives the supply of methanol in parts per hour to reactor R1;
R1, R2 and R3 give the residence periods in hours in the three reactors R1, R2 and R3 respectively, T being the total residence period;
T1, T2 and T3 give the temperature in ° C. in the three reactors R1, R2 and R3;
C1, C2 and C3 give the percentage conversion (with reference to the total conversion) in each of the reactors R1, R2 and R3;
SR indicates whether solids are removed or not;
Y indicates the yield, in parts;
P indicates the percentage purity and
STY gives the space-time yield in parts per part by volume per hour.

TABLE

| E | A1 | A2 | M | R1 | R2 | R3 | T | T1 | T2 | T3 | C1 | C2 | C3 | SR | Y | P | STY |
|---|---|---|---|---|---|---|---|---|---|---|---|---|---|---|---|---|---|
| I | 623 | 0 | 376 | 0.33 | 0.33 | 0.33 | 1 | 50 | 70 | 90-95 | 60 | 26 | 14 | Yes | 990 | 99 | 0.4 |
| II | 623 | 0 | 376 | 0.33 | 0.33 | 0.33 | 1 | 50 | 70 | 90-95 | 60 | 26 | 14 | No | 990 | 95 | 3.8 |
| III | 623 | | 376 | | | | 8 | 40 | 50 | | | | | | 870 | 94 | 0.05 |

We claim:

1. In a process for the production of compounds having the general formula:

(I) $\quad R-(X-CH_2-CH_2-CN)_n$ in which R denotes the radical of a compound selected from the group consisting of an aliphatic, cycloaliphatic, araliphatic, and aromatic n-hydric alcohol and thiol, X is an element selected from the group consisting of oxygen and sulfur and $n$ is an integer between 1 and 4 inclusive, by reaction of compounds having the general formula:

(II) $\quad R-(XH)_n$ with $n$ moles of acrylonitrile (III) in about stoichiometric proportions and in the liquid phase, the improvement which comprises carrying out the reaction with simultaneous supply of reactants (II) and (III) to at least two separate reactors arranged in series and with intense mixing, the residence period in the first reactor being such that at the most 80% of the total conversion takes place in the first reactor and the conversion is ended in the last reactor at a temperature higher than that in the first reactor.

2. A process as set forth in claim 1 wherein the intense mixing is achieved by recirculating the reaction liquid.

3. A process as set forth in claim 1 wherein the residence period is about the same in each reactor and the ratio of the conversion in each reactor to the following reactor is from 15:3 to 2:3.

4. A process as set forth in claim 1 wherein the solid formed in each reactor during the conversion is removed.

No references cited.

CHARLES B. PARKER, *Primary Examiner.*

D. H. TORRENCE, *Assistant Examiner.*